United States Patent

[11] 3,577,820

| [72] | Inventor | Paul Silverstein<br>Jamaica, N.Y. |
|---|---|---|
| [21] | Appl. No. | 770,654 |
| [22] | Filed | Oct. 25, 1968 |
| [45] | Patented | May 4, 1971 |
| [73] | Assignee | Applied Synthetics Corp.<br>East St. Louis, Ill. |

[54] DIE FOR SEALING OR CUTTING THERMOPLASTIC MATERIAL
5 Claims, 14 Drawing Figs.

[52] U.S. Cl. .................................................. 83/171,
76/107, 83/679, 83/698, 156/515, 156/583
[51] Int. Cl. .................................................... B26d 7/10
[50] Field of Search............................................ 83/171,
679, 698, 658, 695, 697, 582; 76/107 (C);
156/515, 583

[56] References Cited
UNITED STATES PATENTS
| 2,381,062 | 8/1945 | Kirsch .......................... | 83/637 |
| 3,000,237 | 9/1961 | Phillips et al. ................ | 76/107 |
| 3,015,601 | 1/1962 | Fener .......................... | 156/515 |
| 3,135,077 | 6/1964 | Siegel et al. .................. | 156/515X |
| 3,212,365 | 10/1965 | Hardy .......................... | 76/107 |

Primary Examiner—James M. Meister
Attorney—Burton L. Lilling

ABSTRACT: A pair of die plates of insulating material, clamped in facing engagement, are routed to form grooves, the groove of one plate being greater in width than the groove of the other plate. Heated die means are then mounted in the grooves.

Patented May 4, 1971

INVENTOR.
PAUL SILVERSTEIN
BY
ATTORNEY

Patented May 4, 1971

INVENTOR.
PAUL SILVERSTEIN

BY

ATTORNEY

Patented May 4, 1971

INVENTOR.
PAUL SILVERSTEIN
BY
ATTORNEY

DIE FOR SEALING OR CUTTING THERMOPLASTIC MATERIAL

SUMMARY OF THE INVENTION

In accordance with the instant invention, it is an important object to provide a die construction of the type described and method of manufacture wherein dies are adapted to be produced by persons of lesser skill than heretofore required, at substantially less expenditure of time, all without sacrifice of accuracy and durability.

It is another object of the present invention to provide a die construction and method of manufacture having the advantageous characteristics mentioned in the preceding paragraph, which method and structure are extremely simple, and result in dies of increased precision and durability at considerable savings in cost.

It is a more important particular object of the present invention to provide a unique method of manufacturing dies of the type described wherein a pair of clamped, facing die plates are grooved in their clamped condition to insure precise conformity of the grooves; and further wherein the clamped plates are simultaneously drilled with locating holes to insure accurate registry when located in a mounting press.

Still another object of the present invention resides in the provision of dies of the type described employing plates of an insulating material, one of which is grooved to conformably receive a heated die element.

Other objects of the present invention will become apparent upon reading the following specification and referring to the accompanying drawings, which form a material part of this disclosure.

The invention accordingly consists in the features of construction, combinations and arrangements of parts and method steps, which will be exemplified in the following description, and of which the scope will be indicated by the appended claims.

DESCRIPTION OF THE PREFERRED EMBODIMENT

Figure 1:
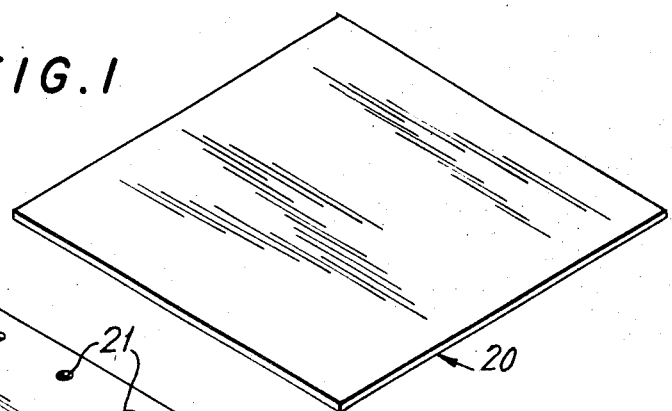
FIG. 1 is a perspective view showing a blank adapted to be formed into a die plate of the present invention.
Figure 2:
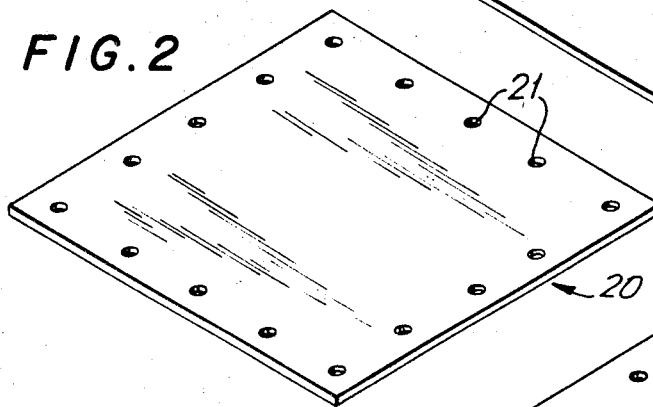
FIG. 2 is a perspective view showing the blank of FIG. 1 in a slightly later stage of formation into a die plate.
Figure 3:
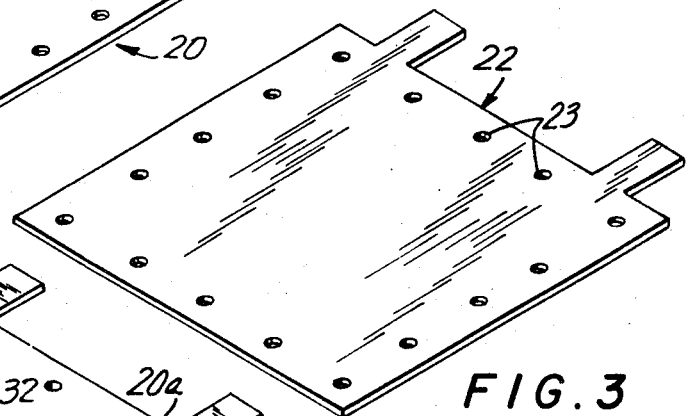
FIG. 3 is a perspective view showing a mounting plate of the present invention employed to mount a die plate in a press, and also in manufacture of the instant die.

Referring now more particularly to the drawings, and specifically to FIGS. 1—3 thereof, there is shown in FIG. 1 a generally rectangular blank, sheet or plate, generally designated 20, adapted to be formed into a die plate of the instant invention. Advantageously, the blank or plate 20 is of high mechanical strength with good machining properties, and having extremely good temperature insulating characteristics. For this purpose, a glass suspension in asbestos has been found highly satisfactory, such as the material manufactured by Johns-Manville and sold under the trademark Marinite. For the purposes of manufacturing the instant die, a pair of the plates 20 are required.

The plate 20 is shown in FIG. 2, having there been formed with a marginal array of through holes 21. In practice, a pair of plates 20 may be simultaneously drilled with holes 21, as by use of a suitable drill fixture, so that the plates and holes are in accurate registry. In addition, subsequent to simultaneous drilling of the holes 21 through a pair of clamped plates 20, the plates may be separated and on their previously facing surfaces the holes 21 may be countersunk, for reasons appearing presently.

An additional plate generally designated 22 and illustrated in FIG. 3, may be formed with a marginal array of internally threaded or tapped holes 23. In practice a pair of plates 22 is employed, each serving to mount a die plate 20 in the final die construction.

Figure 4:
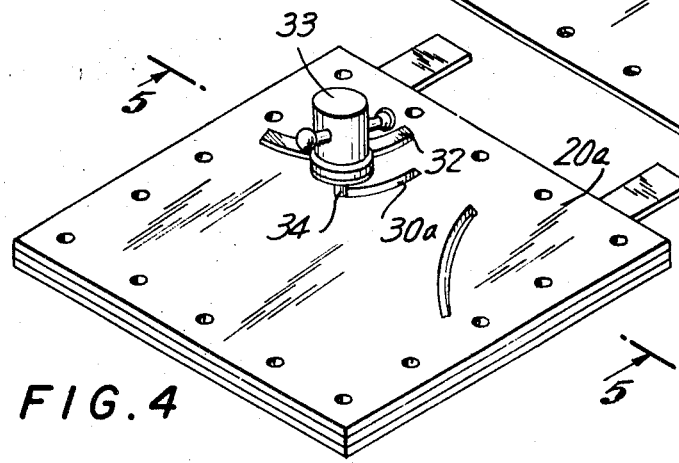
FIG. 4 is a perspective view illustrating an intermediate stage in manufacture of the die in accordance with the present invention.
Figure 5:
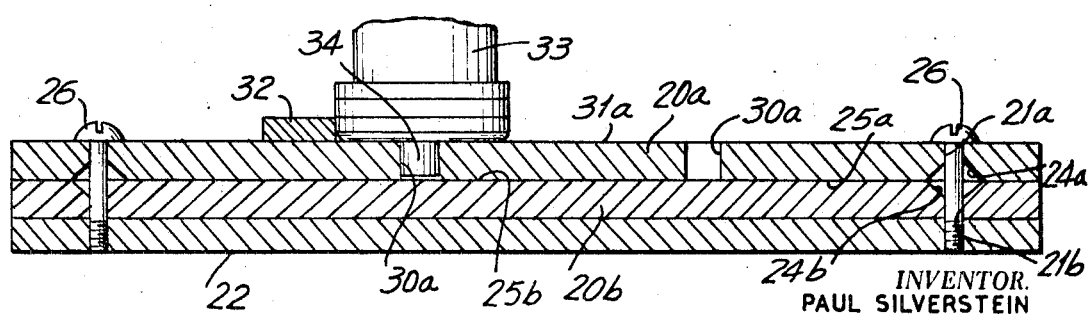
FIG. 5 is a sectional elevational view taken generally along the line 5-5 of FIG. 4.

Referring now to FIGS. 4 and 5, there are shown therein a pair of die plates 20a and 20b, each corresponding to a die plate 20 described hereinbefore, and arranged in facing engagement with each other with their holes 21a and 21b in respective alignment. As described hereinbefore, the holes 21a and 21b are countersunk, as at 24a and 24b, respectively, on their facing, engaging surfaces 25a and 25b. In addition, the die plates 20a and 20b are clamped to a mounting plate 22, say by threaded fasteners 26, or other suitable clamping means.

In this condition of plates 20a, 20b, and 22, being clamped in facing engagement and registry with each other, the plate 20a may be grooved as at 30a. In practice, the nonfacing surface 31a of plate 20a may be marked, or suitable guide means provided such as a template 32, and a router 33 moved along the guide means with its cutter 34 routing the groove 30a. The cutter 34 is of a predetermined width and depth so as to cut the groove 30a completely through the plate 20a, opening through the facing surface 25a and terminating at the facing surface 25b of plate 20b.

Figure 6:
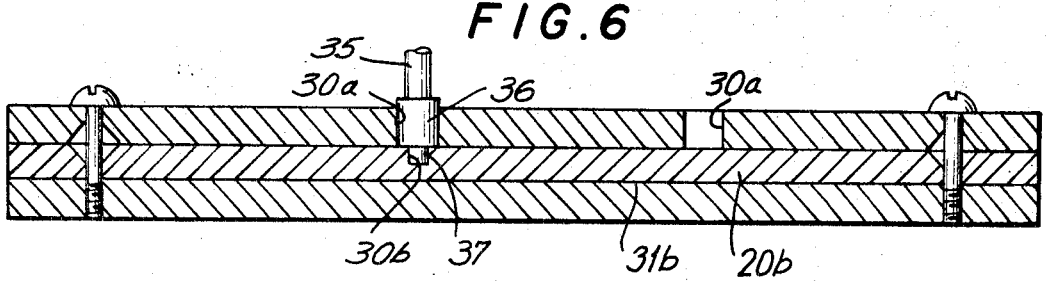
FIG. 6 is a view similar to FIG. 5, showing a slightly later stage in the instant method of die manufacture.

Following completion of the groove 30a, another router tool 35 may be employed to form a groove 30b in the plate 20b, see FIG. 6. The router tool 35 may include a guide sleeve or bushing 36 conformably engageable in the previously routed groove 30a, and a cutter 37 of reduced diameter for cutting engagement in the plate 20b to cut the groove 30b of a width less than the groove 30a. Also, the depth or length of cutter 37 may be less than the thickness of plate 20b, so that the groove 30b terminates short of the nonfacing surface 31b of plate 20b. That is, the groove 30b extends along the groove 30a, the former groove being of less width than the latter, both grooves opening through their facing surfaces for communication with each other in the clamped condition of FIGS. 4—6.

Figure 7:
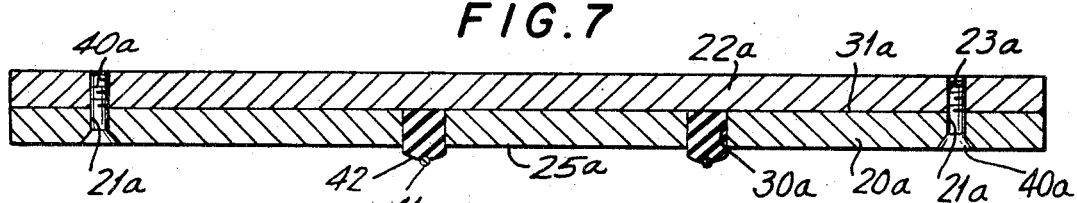
FIG. 7 is a sectional elevational view illustrating one part of a die structure of the present invention.

Upon completion of routing of grooves 30a and 30b, the plates 20a and 20b may be unclamped and separated from each other. The upper plate 20a may then be mounted with its upper surface 31a in facing engagement with the under surface of a mounting plate 22a of the type described in connection with FIG. 3. The plates 20a and 22a may be secured in this condition by fasteners, such as screws 40a extending through holes 21a and into threaded engagement in holes 23a flush with surface 25a. This condition is shown in FIG. 7.

Figure 8:
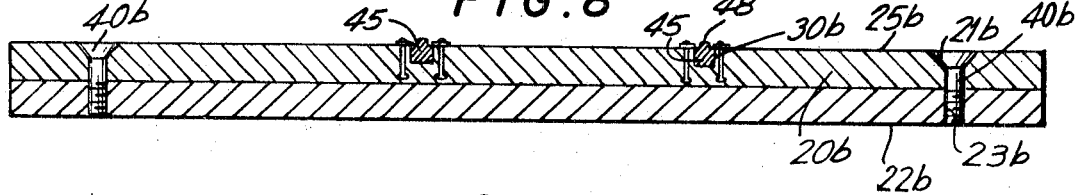
FIG. 8 is a sectional elevational view illustrating another part of the instant die structure.

In FIG. 8, the plate 20b is shown superposed on and in facing engagement with a plate 22b of the type described in FIG. 3, being secured thereto by fasteners 40b extending through holes 21*b* and threadedly into tapped holes 23*b* flush with surface 25*b*. By any suitable means, the plates 22*a* and 22*b* may be fixed in a press and thereby mount the die plates 20*a* and 20*b* for movement toward and away from each other in facing relation, with their grooves 30*a* and 30*b* in aligned registration.

Figure 11:
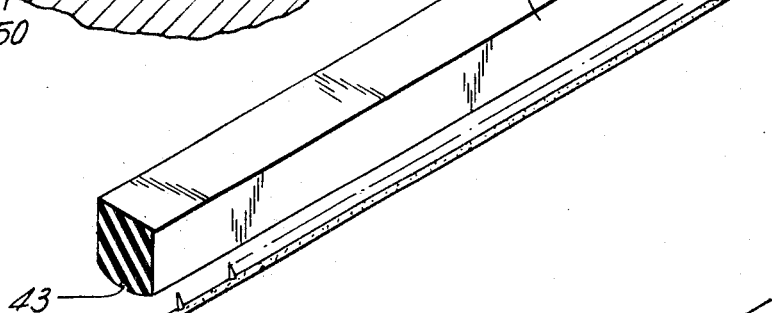
FIG. 11 is an exploded perspective view illustrating one die element of the instant invention.

A die element 41, say in the form of a metal strip or rod is contoured or bent in conformance with the groove 30*a*, and is of a thickness considerably less than the width of groove 30*a* for spaced reception therein. Completely filling the groove 30*a*, and projecting from the groove beyond plate surface 25*a* may be a bedding material 42, such as silicone rubber, or other suitable adhesive insulative material, into which the die member 41 may be embedded. That is, as best seen in FIG. 11, the die member 41 may be provided at spaced locations therealong with pointed or pinlike projections 44 for penetration into the cementitious bedding compound 42 to effectively secure the die element 41 in position within a groove 43. As illustrated, the die element 41 may have one longitudinal surface projecting, beyond the die plate surface 25*a* and the extreme projecting surface of the bedding material 42, toward the complementary die plate 20*b*.

Figure 12:
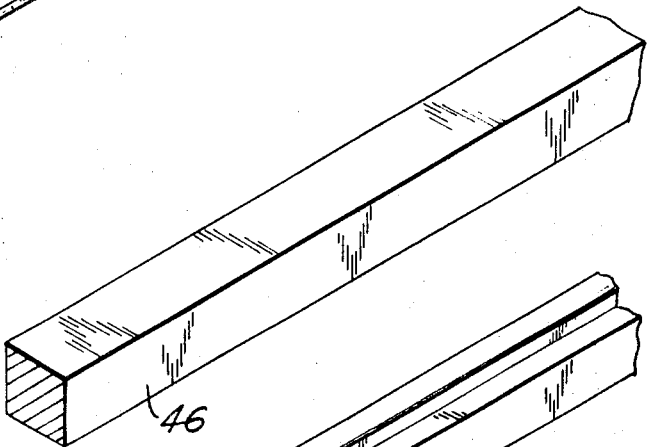
FIG. 12 is a perspective view illustrating a blank used for the formation of the other die element of the present invention.
Figure 13:
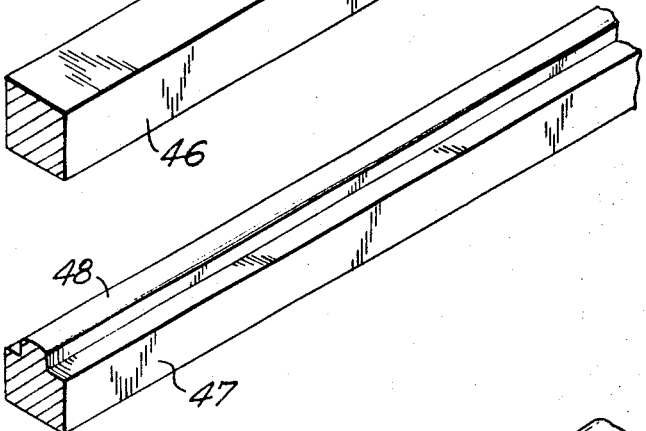
FIG. 13 is a perspective view illustrating a slightly later stage in formation of the die element from the blank of FIG. 12.
Figure 14:
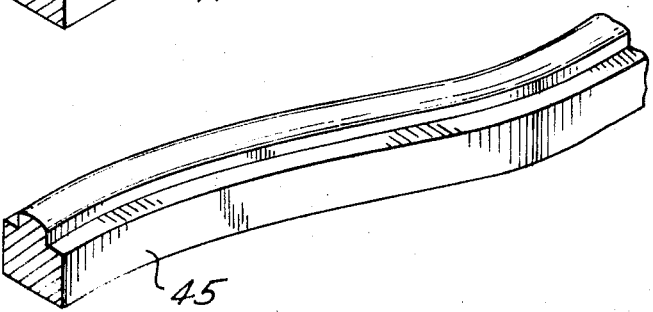
FIG. 14 is a perspective view illustrating the final construction of the die element from the components of FIGS. 12 and 13.

Conformably and snugly engaged in the groove 30*b* of die plate 20*b* is a die element 45. The die element 45 may be formed from bar or ribbon stock, as at 46 in FIG. 12, advantageously of a highly heat conductive material, such as nichrome. The bar stock or strip material 46 is machined to the form of a strip or rod 47 shown in FIG. 13, having a longitudinally extending rib 48 projecting beyond shoulders on opposite sides thereof. The elongate member 47 is then bent in conformance with the groove 30*b* to form the die element 45 shown in FIG. 14. In this condition the die element is snugly engaged in the groove 30*b*, with only the rib 48 projecting beyond the surface 25*b* of plate 20*b*. In addition, the die element 45 may be further secured in die plate 20*b*, as by fasteners or rivets 50 anchored in the die plate on opposite sides of the groove 30*b* and having enlarged heads 51, on the die plate surface 25*b*, partially overlying respective shoulders of the die member 45. Insulation means, such as pads 52 may be engaged beneath the rivet heads 51 to insulate the rivets from the die member 45.

Figure 9:
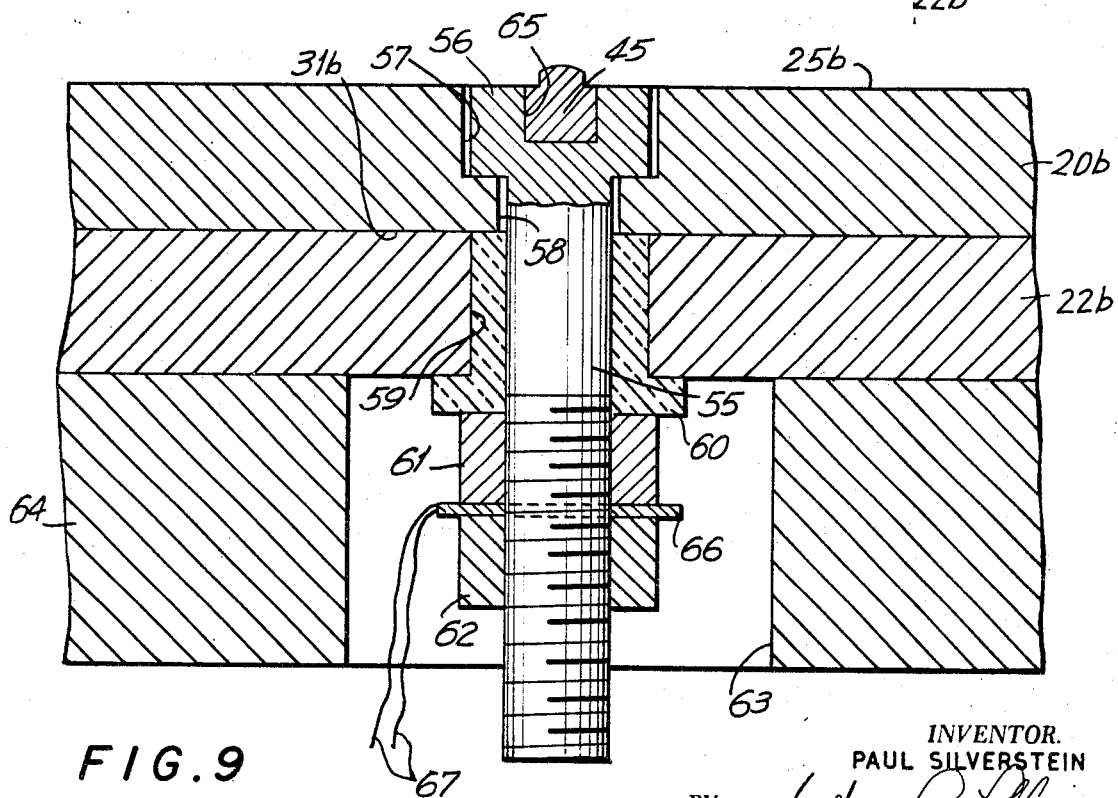
FIG. 9 is a fragmentary sectional elevational view, enlarged for clarity, illustrating certain heating structure of the instant die assembly.
Figure 10:
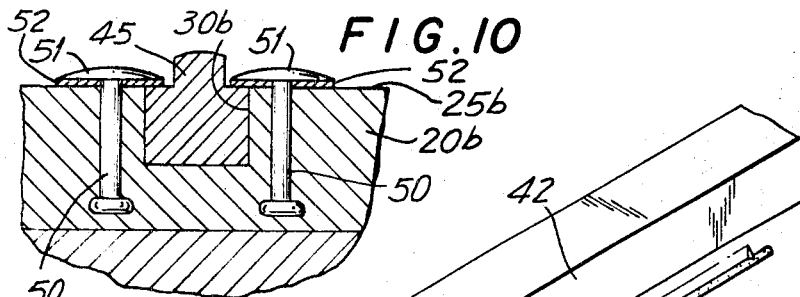
FIG. 10 is a fragmentary sectional view similar to FIG. 8, greatly enlarged.

In order to transmit heat to the die element 45, for use in the cutting or sealing operation, there may advantageously be employed a threaded shank or stem 55, see FIG. 9, having an enlargement or head 56 on one end. In practice, a highly conductive bolt has been found satisfactory. At one or more locations along the groove 30*b*, say at the groove ends, the plate 20*b* may be formed with a groove enlargement 57 for receiving the bolt head. The bolt shank 55 may extend through a hole 58 opening through the surface 31*b* of plate 20*b*, and through a hole 59 through mounting plate 22*b*. An insulating bushing 60 may be circumposed about the bolt shank 55 in the hole 59, and a pair of nuts 61 and 62 threadedly engaged on the bolt shank to maintain the bolt in the described position. The nuts 61 and 62 may be located in an opening 63 formed in the press platen 64.

The bolt head 56 may be slotted as at 65 in alignment with the adjacent portions of groove 30*b* for conformably receiving the die element 45, and the die element may be brazed in the slot 65 for maximum heat conductivity, if desired.

A terminal member or eye 66 may be clamped between the nuts 61 and 62, and connected by electrical conductors 67 to a source of electric power. In this way, heat is transferred to the die element 45 at any desired location for conduction therealong.

From the foregoing, it is seen that the present invention provides a die construction and method of manufacturing the same which fully accomplish their intended objects and are well adapted to meet practical conditions of manufacture and use.

Although the present invention has been described in some detail by way of illustration and example for purposes of clarity of understanding, it is understood that certain changes and modifications may be made within the spirit of the invention and scope of the appended claims.

I claim:

1. A die construction for sealing and cutting thermoplastic material comprising a pair of die plates for mounting in a press in facing relation with each other, said die plates being of insulating material and having their facing surfaces provided with grooves of substantially identical configuration but of opposite hand and arranged in facing conformation with each other, the groove of one plate being of a width greater than the groove in the other of said plates, and die means conformably fixed in each of said grooves for mating engagement with each other upon plate movement in their facing relation.

2. A die construction according to claim 1, wherein said die means comprising first and second die members having substantially identical configurations as said grooves, said first die member being mounted in said groove of said one plate extending in spaced relation therein, and said second die member being mounted in said groove of said other plate in snug engagement therein.

3. A die construction according to claim 2, wherein said die plates each having marginally arranged aligned through holes for registry of said die plates in a press.

4. A die construction according to claim 2, in combination with a resilient material filling said groove of said one plate, and said first die member being embedded in said resilient composition.

5. A die construction according to claim 4, wherein said die plates each being fabricated of a glass suspension in asbestos.